US 6,582,108 B1

United States Patent
Liang

(10) Patent No.: US 6,582,108 B1
(45) Date of Patent: Jun. 24, 2003

(54) LIGHT-EMITTING STRUCTURE OF AN EXHAUST TAILPIPE OF A MOTOR VEHICLE

(75) Inventor: Lien-Feng Liang, Changhua Hsien (TW)

(73) Assignee: Yet Chang Mobile Goods co., Ltd., Changhua Hsien (TW)

( * ) Notice: Subject to any disclaimer, the term of this patent is extended or adjusted under 35 U.S.C. 154(b) by 0 days.

(21) Appl. No.: 10/107,131

(22) Filed: Mar. 28, 2002

(51) Int. Cl.[7] .............................. B60Q 1/00; B60Q 1/26

(52) U.S. Cl. .................. 362/487; 362/496; 362/545

(58) Field of Search ............................... 362/192, 294, 362/545; 180/294, 309; 60/597

(56) References Cited

U.S. PATENT DOCUMENTS 6,386,731 B1 * 5/2002 Cheng ........................ 362/192
6,471,377 B1 * 10/2002 Stegall ....................... 362/487
6,491,418 B1 * 12/2002 Chen .......................... 362/487

* cited by examiner

Primary Examiner—Sandra O'Shea
Assistant Examiner—James W Cranson
(74) Attorney, Agent, or Firm—Harrison & Egbert

(57) ABSTRACT

A light-emitting structure is mounted in the exit port of an automobile exhaust tailpipe and is formed of two rotary members, a power supply system disposed in the interior of the rotary members, and a plurality of light-emitting elements mounted on the rotary members and connected to the power supply system. The power supply system generates electric current at such time when the rotary members are driven to turn by the automobile exhaust fume current.

4 Claims, 5 Drawing Sheets

LIGHT-EMITTING STRUCTURE OF AN EXHAUST TAILPIPE OF A MOTOR VEHICLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an automobile exhaust tailpipe, and more particularly to a light-emitting structure of the automobile exhaust tailpipe.

BACKGROUND OF THE INVENTION

As shown in FIG. 1, an automobile exhaust tailpipe 10 is provided with a light-emitting device 11 and a wire 12 which is used to connect the light-emitting device 11 to the power source of the automobile. The light-emitting device 11 of the prior art is defective in design because the wiring is time-consuming and costly, and because the wire 12 must be insulated from the tailpipe so as to provide the wire 12 with protection against heat of the tailpipe. In addition, the light-emitting pattern of the prior art light-emitting device 11 is rather monotonous and devoid of a dynamic vision effect.

BRIEF SUMMARY OF THE INVENTION

The primary objective of the present invention is to provide an automobile exhaust tailpipe with a light-emitting structure comprising two rotary members, one or more light-emitting elements mounted on the rotary members, and a power supply system mounted in the interior of the rotary members to provided the light-emitting elements with electricity. The rotary members are caused by the exhaust fume current to rotate. As the rotary members are driven to turn by the exhaust fume, the light-emitting elements become connected with the power supply member.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
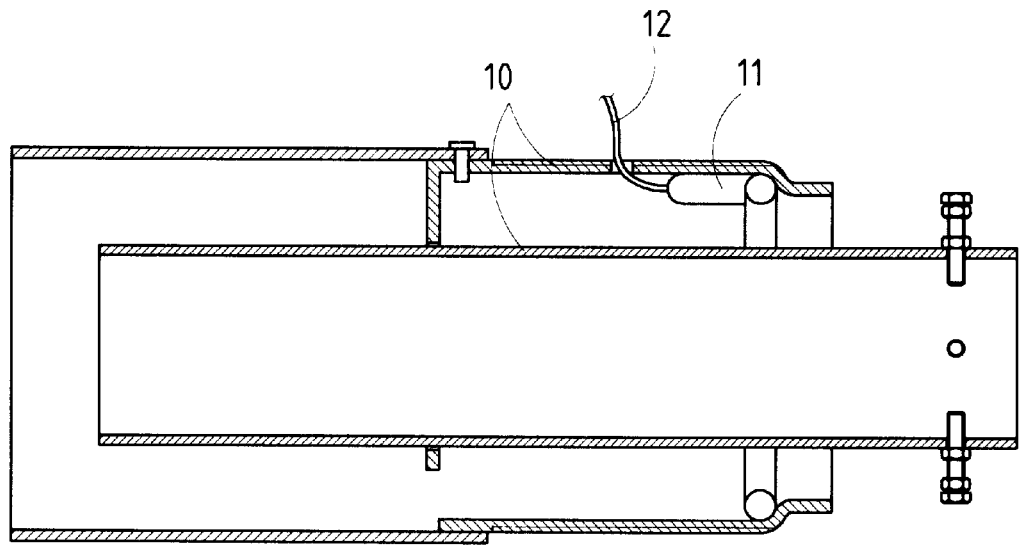
FIG. 1 shows a longitudinal sectional view of a prior light-emitting structure of motor vehicle.
Figure 2:
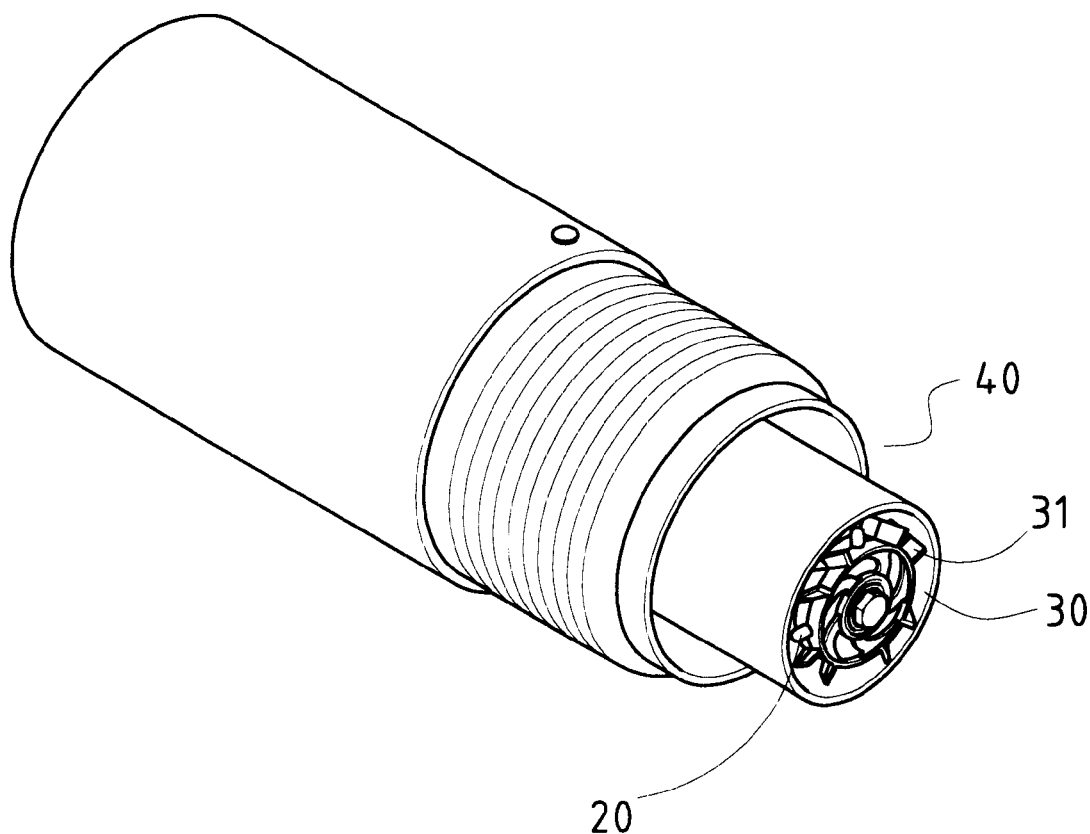
FIG. 2 shows a perspective view of the preferred embodiment of the present invention.
Figure 3:
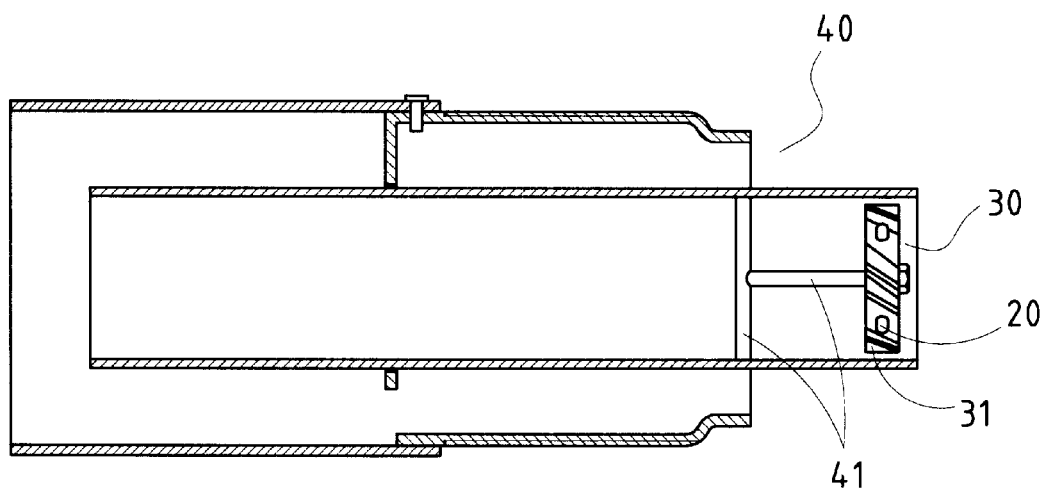
FIG. 3 shows a longitudinal sectional view of the preferred embodiment of the present invention.
Figure 4:
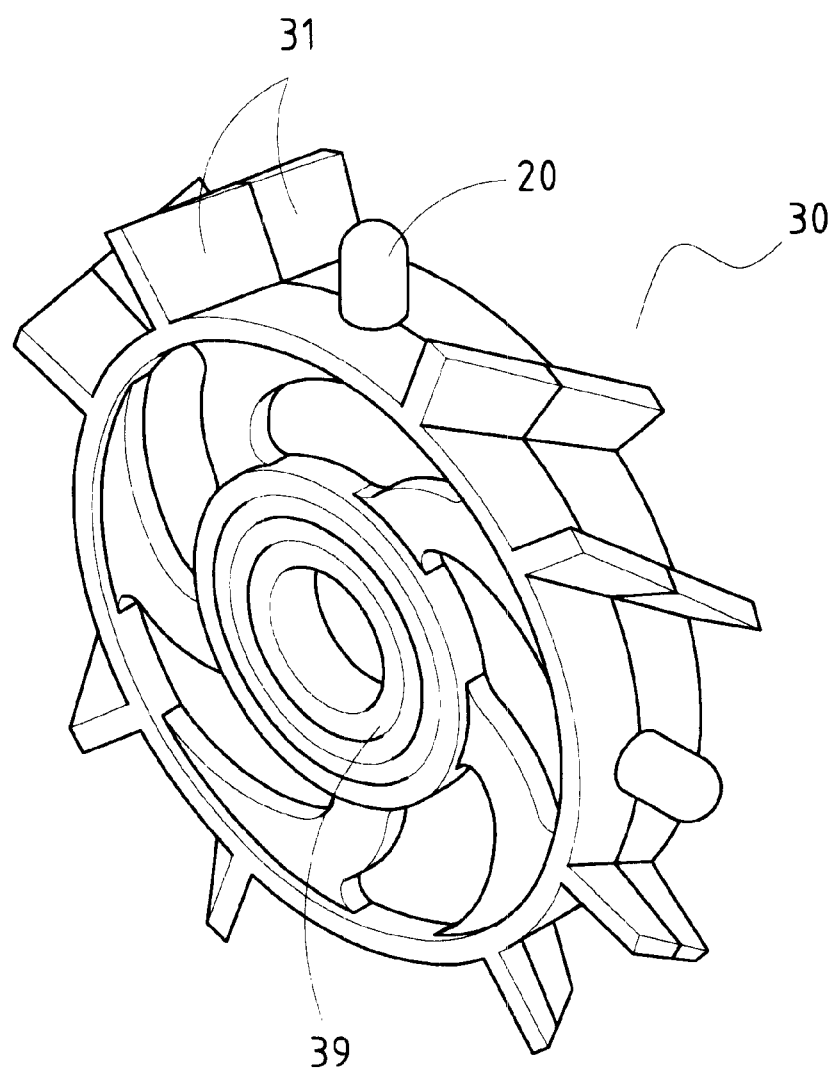
FIG. 4 shows a perspective view of the rotary member of the preferred embodiment of the present invention.
Figure 5:
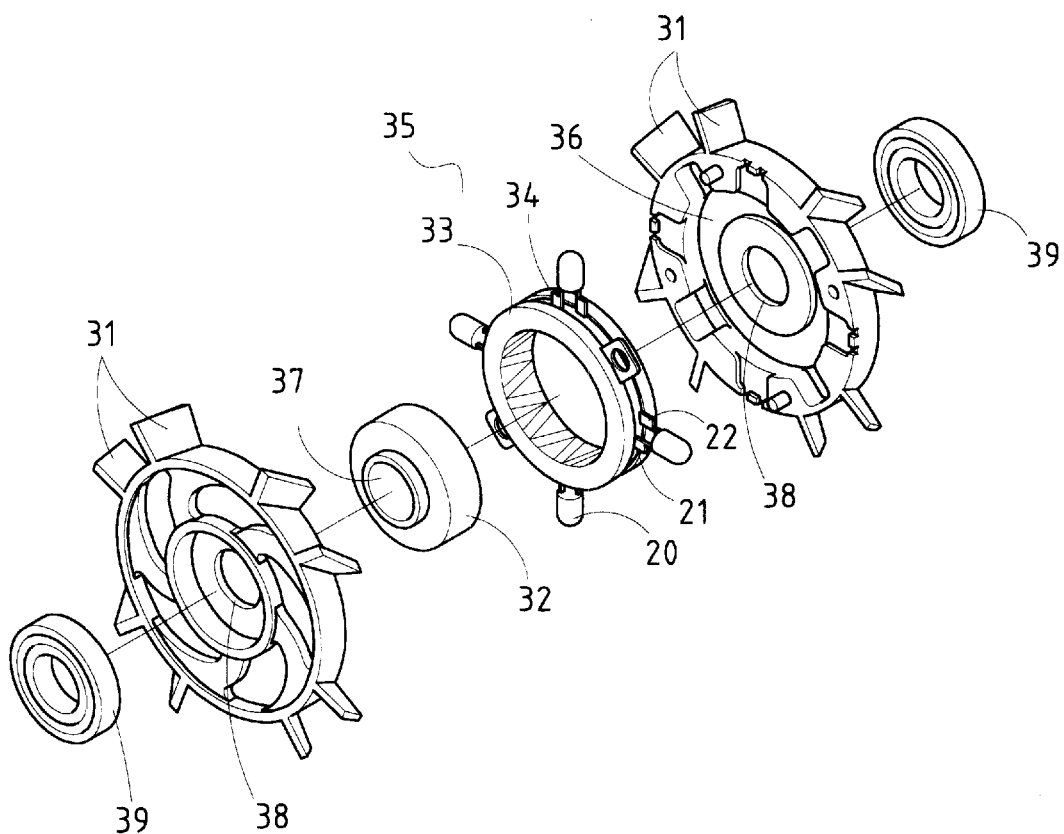
FIG. 5 shows an exploded view of the rotary member of the preferred embodiment of the present invention.

As shown in FIGS. 2–5, a light-emitting structure embodied in the present invention is intended to mount on an automobile exhaust tailpipe 40 and is formed of two rotary members 30, a plurality of light-emitting elements 20, and a power supply system.

The rotary members 30 are symmetrical in construction to each other and are provided along the rim with a plurality of blades 31. The rotary members 30 are further provided in the center with a through hole 38 and an annular slot 36 surrounding the through hole 38. The rotary members 30 are mounted in the exit port of an automobile exhaust tailpipe 40 in conjunction with two bearings 39 such that the rotary members 30 are supported by a support frame 41 of the exhaust pipe 40 the rotary members 30 are driven by the exhaust fume current to rotate, thanks to the blades 31 of the rotary members 30.

The light-emitting elements 20 are mounted on the rotary members and are provided with a positive bonding wire 21 and a negative bonding wire 22.

The power supply system comprises a magnetic core bearing 32 and a coil member 35. The magnetic core bearing 32 has a center through hole 37 and is received in the coil member 35. The coil member 35 is provided with a positive pawl piece 33 and a negative pawl piece 34. The coil member 35 is located in the annular slots 36 of the rotary members 30 such that the positive pawl piece 33 is connected with the positive bonding wires 21, and that the negative pawl piece 34 is connected with the negative bonding wires 22 of the light-emitting elements 20. As the rotary members 30 are driven by the exhaust fume current to turn, an electric current is generated by the coil member 35 and the magnetic core bearing 32 of the power supply system. The electric current is made available to the light-emitting element 20.

In order to enhance the visual effect of the present invention, the light-emitting elements 20 may be colored variously.

The rotary members 30 are made of a refractory material to withstand the heat of the exhaust fume.

The power supply system of the present invention is independent of the power supply system of the motor vehicle.

The embodiment of the present invention described above is to be regarded in all respects as being illustrative and restrictive. Accordingly, the present invention may be embodied in other specific forms without deviating from the spirit thereof. The present invention is therefore to be limited only by the scope of the following claims.

I claim:

1. A light-emitting structure mounted in the exit port of an automobile exhaust tailpipe comprising:

two rotary members symmetrical in construction and comprised of a center through hole and a plurality of blades, said two rotary members being mounted rotatably in the exit port of the automobile exhaust pipe by a support frame such that said two rotary members are driven to turn by the automobile exhaust fume;

a power supply system located in the interior of said rotary members; and a plurality of light-emitting elements mounted on said rotary members and connected to said power supply system whereby said light-emitting elements are provided with electric current by said power supply system at such time when said rotary members are driven to turn by the automobile exhaust fume.

2. The light-emitting structure as defined in claim 1, wherein said power supply system comprises a coil member and a magnetic core bearing received in said coil member, said coil member comprised of a positive pawl piece connected with a positive bonding wire of said light-emitting elements, and a negative pawl piece connected with a negative bonding wire of said light-emitting elements whereby said coil member and said magnetic core bearing generate electric current at such time when said rotary members are driven to turn by the automobile exhaust fume current.

3. The light-emitting structure as defined in claim 1, wherein said rotary members are comprised of a refractory material.

4. The light-emitting structure as defined in claim 1, wherein said light-emitting elements are colored variously.

* * * * *